United States Patent Office 2,946,802
Patented July 26, 1960

2,946,802
METHOD OF PREPARING β-ANILINOPYRIDINE

Otto Zima, Darmstadt-Eberstadt, and Ernst Jacobi, Darmstadt, Germany, assignors to E. Merck, Aktiengesellschaft, Darmstadt, Darmstadt, Germany, a corporation of Germany No Drawing. Filed Oct. 11, 1957, Ser. No. 689,478

4 Claims. (Cl. 260—296)

This invention relates to β-anilinopyridine; and has for its principal object the provision of a new method of manufacturing the same.

β-Anilinopyridine has been produced by Spaeth and Eiter by heating 3-pyridyl-benzotriazole with zinc chloride; and by heating β-aminopyridine, iodobenzene, potash and elemental copper in a bomb tube at 200° C. (see Berichte, volume 73, pages 722–723 (1940)). However, both methods result in a poor yield of the substance.

It has been found that a high yield of β-anilinopyridine can be obtained by decarboxylating N-(3-pyridyl)-anthranilic acid by heating. This reaction can be carried out either in the presence or in the absence of decarboxylating catalysts or high boiling inert solvents. Suitable catalysts are, for instance, copper salts (copper-II-acetate, copper-II-sulphate or mixtures thereof), or copper-II-oxide or copper powders. Suitable solvents are high boiling stable inert substances which are solid or liquid at room temperature. The reaction temperature is preferably between 200° and 300° C. The beginning and termination of the desired reaction may be readily ascertained by observing the beginning and termination of the carbon-dioxide evolution.

The N-(3-pyridyl)-anthranilic acid required as starting material can be produced, for instance, by heating potassium-o-bromobenzoate with β-aminopyridine and copper powder in amyl-alcohol (see Journal of the Chemical Society, London, 1942, page 726). With this reaction, the solvent may be omitted and the potassium salt of the o-bromobenzoic acid can be replaced by a mixture of this acid with potash. The mentioned pyridyl-anthranilic acid can also be produced by heating anthranilic acid, 3-bromopyridine, potash and copper-bronze in a high boiling solvent (see Journal of the Chemical Society, London, 1945, page 928).

The β-anilinopyridine which has become readily available by the present invention shows a surprisingly specific depressive action upon the spinal cord and can hence be used as a pharmaceutical or an an intermediate product for manufacturing other pharmaceuticals.

The following are illustrative examples in accordance with this invention:

Example 1

5.1 grams of crude N-(3-pyridyl)-anthranilic acid are mixed with 0.25 gram of copper powder and heated to 250° C. As soon as the carbon dioxide evolution subsides, the mixture is heated to 280° C. for a short period of time. The cooled reaction mass is dissolved in diluted hydrochloric acid (concentration 12%). The solution is filtered over carbon and added drp by drop while being stirred into an excess of caustic soda preferably cooled with ice. The precipitated β-anilinopyridine is sucked off, washed with water and recrystallized from tetrahydrofuran petroleum ether. The yield is 3.4 grams of β-anilinopyridine of F.P. 142° to 143°.

Example 2

4.0 grams of crude N-(3-pyridyl)-anthranilic acid are heated for some time to 250° C. After the completion of the carbon dioxide development, the substance is heated to 280° C. for a few minutes. The residue in the flask is subsequently sublimed under vacuum. The yield is 2.7 grams of β-anilinopyridine of F.P, 142°; K.P. 12; Torr.=179°.

Example 3

5.0 grams of crude N-(3-pyridyl)-anthranilic acid are hetated to 250° C. with 30 grams of phenanthrene and 0.1 gram of copper. As soon as the carbon dioxide development subsides, the mixture is heated for a short time to 280° to 290°° C. The residue in the flask is then taken up in diluted hydrochloric acid (concentration 12%). The solution is filtered through carbon and rendered alkaline with an excess of caustic soda. The precipitated β-anilinopyridine is removed by suction, dried and sublined under vacuum. The yield is 2.1 grams of the pure substance of F.P. 143°.

Example 4

93.5 grams of crude N-(3-pyridyl)-anthranilic acid are mixed with (a) 9.3 grams of copper acetate, (b) 7.2 grams of copper I chloride and heated to 240° C. As soon as the carbon dioxide evolution subsides, the mixture is heated to 260° C. for a short period of time. The reaction mass is cooled to 220° C. and subjected to a vacuum distillation. The product obtained is β-anilinopyridine and can be purified by dissolving it in diluted hydrochloric acid (concentration 12%). The solution is filtered over carbon and added drop by drop while being stirred into an excess of ammonia. The precipitated β-anilinopyridine is sucked off and washed with water. The dried product melts at 142° C.

It will be understood that the foregoing description of the invention and the examples set forth are merely illustrative of the principles thereof. Accordingly the appended claims are to be construed as defining the invention within the full spirit and scope thereof.

We claim:
1. Method of preparing β-anilinopyridine which comprises heating N-(3-pyridyl)-anthranilic acid to a temperature in the approximate range of 200°–300° C.
2. Method of preparing β-anilinopyridine which comprises heating N-(3-pyridyl)-anthranilic acid to a temperature in the approximate range of 200°–300° C. in the presence of a high boiling inert solvent.
3. Method of preparing β-anilino-pyridine which comprises heating N-(3-pyridyl)-anthranilic acid to a temperature in the approximate range of 200–300° C. in the presence of a member of the group consisting of copper salts, copper oxide and elemental copper.
4. Method of preparing β-anilino-pyridine which comprises heating N-(3-pyridyl)-anthranilic acid to a temperature in the approximate range of 200–300° C. in the presence of a high boiling inert solvent and of a member of the group consisting of copper salts, copper oxide and elemental copper.

References Cited in the file of this patent

Hurd: The Pyrolysis of Carbon Compounds (1929), pp. 342–3.